United States Patent
Roberts et al.

(10) Patent No.: US 10,251,340 B2
(45) Date of Patent: Apr. 9, 2019

(54) METHOD FOR ESTIMATING FEED QUALITY OF ALFALFA AS IT IS CUT

(71) Applicant: AGCO Corporation, Hesston, KS (US)

(72) Inventors: Jeffrey Sullivan Roberts, Hudson, WI (US); Ryan Paul Johnson, Hudson, WI (US); Grant Lewis Good, Hesston, KS (US); Nyle C. Wollenhaupt, Camdenton, MO (US); L. Grant Macneill, Suwanee, GA (US)

(73) Assignees: AGCO Corporation, Duluth, GA (US); HARVEST TEC, Inc., Hudson, WI (US)

( * ) Notice: Subject to any disclaimer, the term of this patent is extended or adjusted under 35 U.S.C. 154(b) by 0 days.

(21) Appl. No.: 15/129,903

(22) PCT Filed: Mar. 27, 2015

(86) PCT No.: PCT/US2015/022947
§ 371 (c)(1),
(2) Date: Sep. 28, 2016

(87) PCT Pub. No.: WO2015/148902
PCT Pub. Date: Oct. 1, 2015

(65) Prior Publication Data
US 2017/0164554 A1 Jun. 15, 2017

Related U.S. Application Data

(60) Provisional application No. 61/971,674, filed on Mar. 28, 2014.

(51) Int. Cl.
*A01D 34/00* (2006.01)
*A01D 41/00* (2006.01)
(Continued)

(52) U.S. Cl.
CPC .......... *A01D 41/00* (2013.01); *A01D 34/006* (2013.01); *A01D 41/06* (2013.01); *A01D 41/127* (2013.01); *A01D 41/1277* (2013.01)

(58) Field of Classification Search
CPC ........................ A01D 34/001; A01D 34/006
See application file for complete search history.

(56) References Cited

U.S. PATENT DOCUMENTS

| 7,077,743 B2 * | 7/2006 | Quincke | A01D 43/085 460/114 |
| 7,311,013 B1 | 12/2007 | Hoskinson et al. | |

(Continued)

FOREIGN PATENT DOCUMENTS

WO 2014/130179 A1 8/2014

OTHER PUBLICATIONS

European Patent Office, International Search Report for Intl. Patent Application No. PCT/US2015/022947, dated Jun. 22, 2015.

*Primary Examiner* — John Weiss (57) ABSTRACT

In one embodiment, a method implemented in an agricultural machine harvesting alfalfa plants, the method comprising: receiving, in real time, input corresponding to a plurality of sensed parameters corresponding to alfalfa plant height and cut alfalfa volume; associating the cut alfalfa volume to an alfalfa stem diameter; and automatically determining a feed quality value for the alfalfa plants based on the sensed alfalfa plant height and the alfalfa stem diameter.

10 Claims, 6 Drawing Sheets

(51) Int. Cl.
*A01D 41/127* (2006.01)
*A01D 41/06* (2006.01)

(56) References Cited

U.S. PATENT DOCUMENTS

| | | | | |
|---|---|---|---|---|
| 9,226,449 | B2* | 1/2016 | Bischoff | A01D 75/00 |
| 9,410,840 | B2* | 8/2016 | Acheson | A01D 41/1272 |
| 9,578,808 | B2* | 2/2017 | Dybro | A01D 75/00 |
| 9,707,972 | B2* | 7/2017 | Tuncer | B60W 50/085 |
| 9,734,400 | B2* | 8/2017 | Shriver | G06K 9/00657 |
| 9,807,938 | B2* | 11/2017 | Wilken | A01F 12/184 |
| 2003/0184747 | A1* | 10/2003 | Diekhans | A01D 41/127 |
| | | | | 342/123 |
| 2004/0200200 | A1* | 10/2004 | Quincke | A01D 43/085 |
| | | | | 56/10.2 R |
| 2013/0152534 | A1* | 6/2013 | Clark | A01D 34/006 |
| | | | | 56/10.2 B |
| 2013/0205733 | A1 | 8/2013 | Peters et al. | |
| 2014/0230391 | A1* | 8/2014 | Hendrickson | G01N 33/0098 |
| | | | | 56/10.2 R |
| 2014/0331631 | A1* | 11/2014 | Sauder | A01D 45/021 |
| | | | | 56/10.2 R |

\* cited by examiner

METHOD FOR ESTIMATING FEED QUALITY OF ALFALFA AS IT IS CUT

CROSS REFERENCE TO RELATED APPLICATION

This application claims the benefit of U.S. Provisional Application No. 61/971,674, filed Mar. 28, 2014, which is hereby incorporated by reference in its entirety.

TECHNICAL FIELD

The present disclosure is generally related to agricultural machines and, more particularly, agricultural machines for cutting crops.

BACKGROUND

Some agricultural crops, such as alfalfa, are often assigned a feed quality. As is known, feed quality is a common measurement used to value alfalfa when sold for consumption by livestock. Alfalfa varies significantly in feed quality based on its maturity when harvested. For instance, as alfalfa matures, it decreases in feed quality. On the other hand, young, pre-bud alfalfa typically has a feed quality twice that of the feed quality for more mature, post-bloom alfalfa. As an alfalfa plant matures, it increases in height. Conventional feed quality measurement methods use alfalfa plant height as an indicator of feed quality before the alfalfa is cut. However, the relationship between the height of the alfalfa plant and its maturity can change as the conditions of growth vary.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a method implemented in an agricultural machine harvesting alfalfa plants, the method comprising: receiving, in real time, input corresponding to a plurality of sensed parameters corresponding to alfalfa plant height and cut alfalfa volume; associating the cut alfalfa volume to an alfalfa stem diameter; and automatically determining a feed quality value for the alfalfa plants based on the sensed alfalfa plant height and the alfalfa stem diameter.

DETAILED DESCRIPTION

Certain embodiments of a feed quality estimator system and method are disclosed that monitor a plurality of parameters (e.g., plant height, cut volume, etc.) pertaining to harvested crop, such as alfalfa plants, and provide a feed quality value based on the plurality of parameters. In one embodiment, an agricultural machine, such as a windrower, is equipped with a sensor for monitoring a standing height of alfalfa plants (i.e., alfalfa plant height), for instance just as it is cut. Another sensor may be used to monitor a volume of the cut alfalfa (e.g., cut stems) as it flows through the windrower. For instance, in one embodiment, the sensor may monitor a gap (variable) between conditioning rolls of the windrower, the gap providing an indication of the volume of the cut alfalfa (which in turn is associated with a stem diameter, which provides an indication of the maturity of the harvested alfalfa plants). A controller receives the input from the plural sensors and determines a feed quality value. In one embodiment, the feed quality value may be determined based on an expected feed quality value at a given alfalfa plant height as adjusted for the volume (and hence stem diameter) of the flow of cut alfalfa plants.

Digressing briefly, past techniques for determining feed quality values for alfalfa used solely the alfalfa plant height to predict feed quality. Such techniques tend to be inaccurate, especially on later cutting (e.g., typically alfalfa undergoes harvesting on more that one occasion per season) as growing conditions affect the height-to-maturity relationship. In contrast, certain embodiments of feed quality estimator systems determine a feed quality value based on a combination of alfalfa plant height and cut alfalfa volume as the alfalfa is harvested, which may provide a better indication of the feed quality of the alfalfa.

Having summarized certain features of a feed quality estimator system of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on a machine in the agricultural industry, and in particular, a self-propelled windrower with a rotary header drive system, certain embodiments of a feed quality estimator system may be beneficially deployed in other agricultural machines (e.g., self-propelled or towed, using one of a variety of crop cutting implements, such as sickle-type cutting implements, among others) for harvesting alfalfa plants or other crops where plant height and stem diameter (maturity) are relevant to feed quality. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly. Also, though maturity of the alfalfa plant is described in the context of stem thickness, it should be appreciated within the context of the present disclosure that similar terms such as stalk or the like to describe (e.g., for the alfalfa plant or other plants) any plant structure that correlates to plant maturity may similarly apply and hence is considered to be within the scope of the present disclosure.

Figure 1:
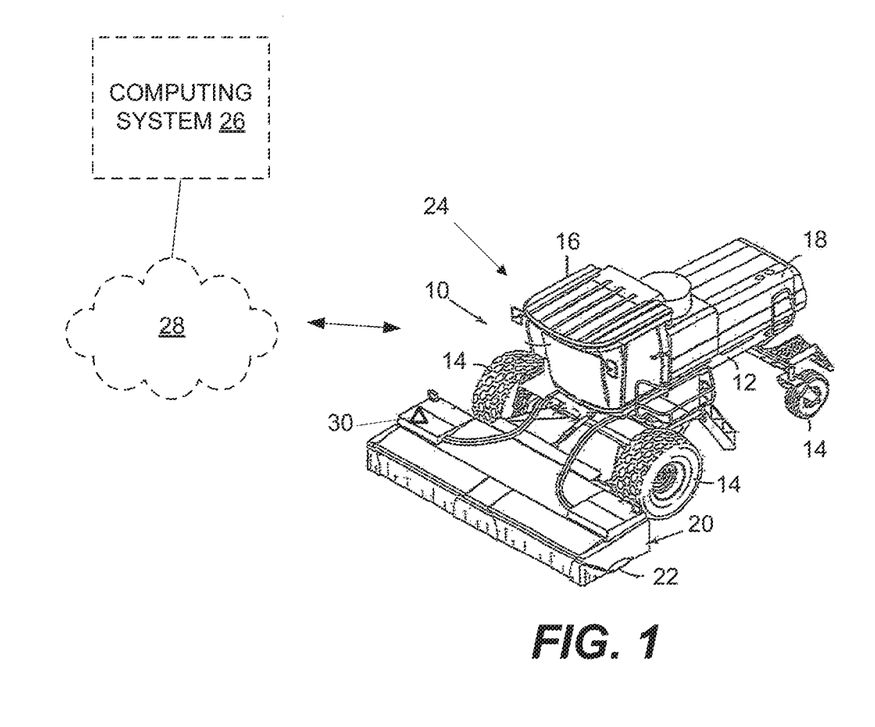
FIG. 1 is a schematic diagram that illustrates, in front perspective view, an example agricultural machine in which an embodiment of a feed quality estimator system may be implemented.

Reference is made to FIG. 1, which illustrates an example agricultural machine where an embodiment of a feed quality estimator system may be implemented. One having ordinary skill in the art should appreciate in the context of the present disclosure that the example agricultural machine, depicted in FIG. 1 as a self-propelled windrower 10, is merely illustrative, and that other towed or self-propelled machines and/or components with like functionality may deploy certain embodiments of a feed quality estimator system in some embodiments. The self-propelled windrower 10 is operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 (although tracks may be used in some embodiments, or other configurations in the number and/or arrangement of wheels may be used in some embodiments) for movement across a field to be harvested. The chassis 12 carries a cab 16, within which an operator may control certain operations of the windrower 10, and a rearwardly spaced compartment 18 housing a power source (not shown) such as an internal combustion engine. The chassis 12 also supports a ground drive system that, in one embodiment, when powered by the engine, causes differential rotation of the wheels (e.g., increasing the speed of one wheel while decreasing the speed of the opposite wheel) according to a dual path steering mechanism as is known in the art, although other drive/steering mechanisms may be used in some embodiments.

A coupled working implement, depicted in FIG. 1 as a harvesting header 20, is supported on the front of the chassis 12 in a manner understood by those skilled in the art. The header 20 may be configured as a modular unit and consequently may be disconnected for removal from the chassis 12. As is also known in the art, the header 20 has a laterally extending crop cutting assembly 22 in the form of a low profile, rotary style cutter bed located adjacent the front of the header 20 for severing crop from the ground as the windrower 10 moves across a field. However, one skilled in the art will understand that other types of crop cutting assemblies 22, such as sickle style cutter beds, may also be used in some embodiments.

The windrower 10 also includes a feed quality estimator system 24, which may in one embodiment include one or more controllers and one or more sensors that monitor, in real time, a plurality of parameters (e.g., un-cut plant height (standing height), cut plant volume, stem diameter), as further described below. The feed quality estimator system 24 determines a feed quality value based on the plurality of parameters. Some embodiments of the feed quality estimator system 24 may reside entirely in the windrower 10. In some embodiments, the feed quality estimator system 24 may be distributed among plural locations. For instance, as shown in phantom in FIG. 1, a remotely-located computing system 26 may be part of the feed quality estimator system 24 in some embodiments (or separate in some embodiments), with interfaces on the windrower 10 and one or more devices of the computing system 26 enabling bi-directional communications via a network 28. The computing system 26 may be a server device, gateway, and/or other computing device, and may include plural devices in some embodiments. The network 28 may comprise one or more networks, including a wireless network (e.g., cellular, WiFi, Wide Area Network, Local Area Network, radio frequency, terrestrial, satellite, etc.) and a wired network (e.g., POTS, cable, etc.), as should be appreciated by one having ordinary skill in the art. Other components and/or facilities known in the art and which may be used in some embodiments, such as cellular towers, DSLAMs, ISP facilities, etc., are omitted here for brevity.

In one embodiment, a sensor 30, shown schematically in FIG. 1 as a triangle for simplicity, may be coupled to the header 20 to monitor standing plant height (e.g., of the alfalfa plant). It should be appreciated that the location depicted for the sensor 30 in FIG. 1 is merely illustrative, and other locations on the windrower 10 may be used to monitor the standing (un-cut plant) height. The sensor 30 may comprise a mechanical or electrical sensor using contact or non-contact technology. For instance, in one embodiment, the sensor 30 may be an imaging device using one of a plurality of available wavelengths. In some embodiments, the sensor 30 may also monitor stem diameter (e.g., un-cut or cut) or a cut crop (e.g., stem) volume (e.g., if appropriately positioned). In some embodiments, as described below, another sensor may be used to monitor the volume of cut crop as it flows through the windrower 10, which is associated with the stem diameter (and hence maturity). A sensor arrangement using two spatially disparate sensors is discussed hereinafter for illustrative purposes, with the understanding that certain embodiments may use a single sensor or additional sensors (e.g., arranged vertically in predefined length increments to determine height, arranged in additional locations, etc.) to monitor the plural parameters.

During an example harvesting operation, the windrower 10 moves forward through the field with the header 20 lowered to a working height. The sensor 30 monitors the standing height of the un-cut plants to be harvested (e.g., alfalfa plants), with the sensed height communicated to a controller, as described below. As to additional monitoring, attention is directed to FIGS. 2A-2B, which illustrate example embodiments for sensing the volume of harvested crop and hence using the associated stem diameter as one of the additional parameters for feed quality estimations.

Figure 2A:
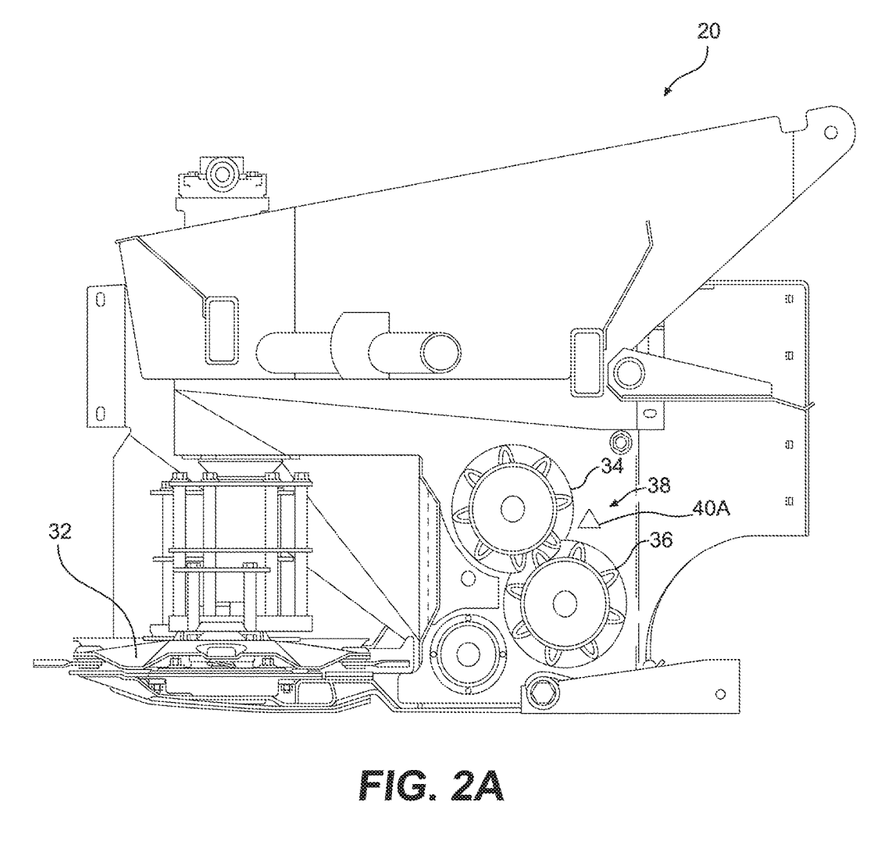
FIG. 2A is a schematic diagram that illustrates, in fragmentary side elevation, cut-away view, an example location for a volume sensor of an embodiment of a feed quality estimator system.
Figure 2B:
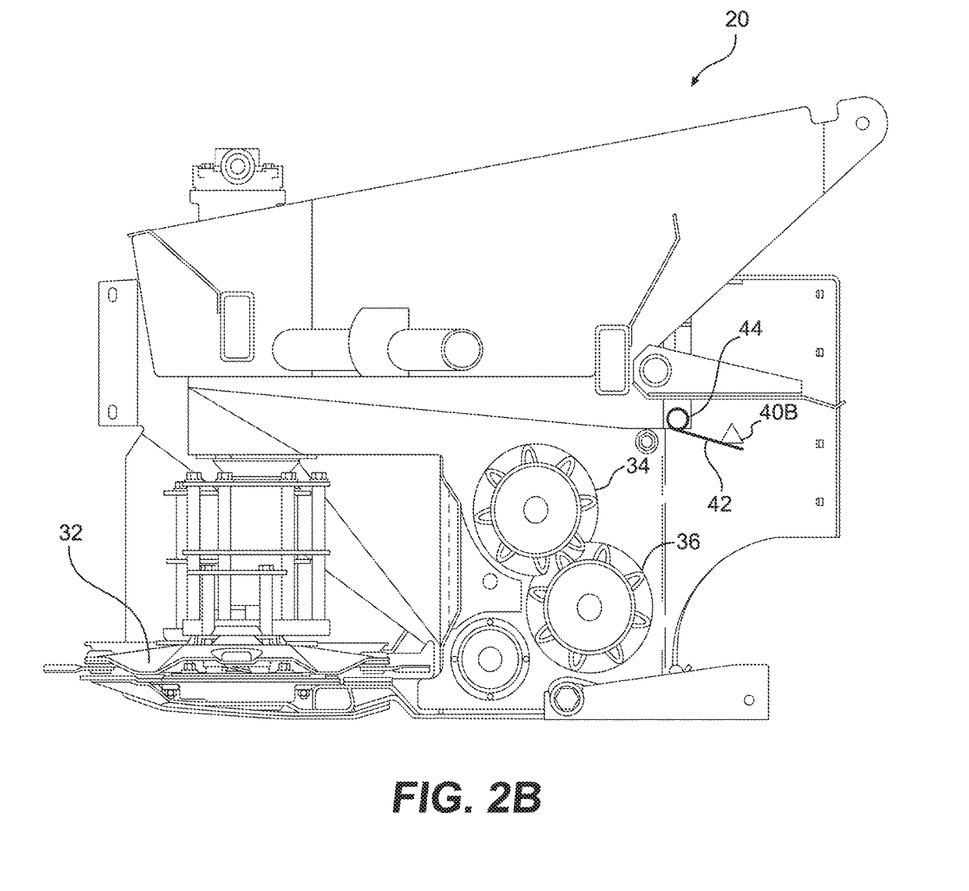
FIG. 2B is a schematic diagram that illustrates, in fragmentary side elevation, cut-away view, another example location for a volume sensor of an embodiment of a feed quality estimator system.

Referring to FIG. 2A, shown in side elevation view is one embodiment of a sensor arrangement for an embodiment of a feed quality estimator system 24 (FIG. 1). In particular, a cut-away side elevation view of a portion of the header 20 is shown, with a rotary cutter 32 (cutting assembly, with a similar configuration for sickle-type conditioning machines) engaging the un-cut plants on the left hand side of FIG. 2A, and a volume of the cut plants (e.g., plant stems) flowing from a discharge end of the cutter 32 to the conditioning rolls 34 and 36 in known manner. The conditioning rolls 34 and 36 are arranged to form a variable gap 38 in between the rolls, through which a volume of cut plant stems is permitted to flow. A sensor 40A (schematically shown in FIG. 2A as a triangle for simplicity), monitors the gap 38 as the volume of cut plant stems flows through the gap 38, displacing the rolls 34 and/or 36. It is noted that the position of the sensor 40A depicted in FIG. 2A is merely illustrative, and that in some embodiments, the position of the sensor 40A may be located elsewhere (e.g., at the center shaft of one of the conditioning rolls 34 or 36, etc.). Digressing briefly, and as indicated above, the relationship between (solely) the height of the alfalfa plant and its maturity can change as the conditions of the growth vary, causing the plant to mature at a given rate while not necessarily increasing in plant height at the same rate. Alfalfa plants are cut for harvest multiple times during the growing season and the relationship between maturity and height are not as strong in the subsequent cuttings as it is for the first cutting. Thus, recommendations to make estimates of feed quality based on plant height are generally not given for subsequent cuttings. However, as the alfalfa plant matures, it also increases in volume as the stem of the plant increases in diameter, even though the height of the plant may not increase (or not increase at a similar rate). Accordingly, an increase in volume results in an increase in crop flow through the windrower 10. This volume variable is measured in one embodiment by the displacement of the conditioning rolls 34 and 36 through monitoring of the gap 38. That is, in one embodiment, as volume increases, the displacement of the conditioning rolls 34 and/or 36 is monitored (e.g., measured) by the sensor 40A sensing the gap 38 between the rolls 34 and 36. In some embodiments, the sensor 40A may monitor the direct displacement of each roll 34 or 36, or both, that move in response to the changes in volume (which indirectly monitors the gap 38). Height measurements provide an indication of maturity to some extent, and volume also provides an indication of maturity to some extent. Using, at least in one embodiment, two (2) sensor inputs, standing plant height before cutting and sensed volume through measured displacement of the conditioning rolls 34 and/or 36 or the gap 38, the feeding value based on the maturity of the alfalfa plant can be more closely predicted compared to using either input alone.

The volume is associated by a controller in the feed quality estimator system 24 with stem diameter (e.g., through the use of stored predetermined plant or plant stem volumes to stem diameter values stored in a look-up table or other data structure, or in some embodiments, using programmed conversion factors), which provides an indication of the maturity of the crop (e.g., alfalfa plants). The sensor 40A may be embodied as a contact or non-contact type of sensor, as should be appreciated by one having ordinary skill in the art within the context of the present disclosure. Also, as suggested above, locations than that illustrated in FIG. 2A for the sensor 40A and/or a different quantity of sensors of the same or different type may be used to monitor the volume in some embodiments.

As noted above, other sensing mechanisms may be used to determine the maturity of the crop. For instance, as noted above, direct imaging of the stem diameter (pre-cut) and height may be implemented (e.g., using one or more imaging sensors). In some embodiments, the volume measurement may be indirectly determined, such as by monitoring (e.g., measuring) the force of impact of the cut volume on a plate and associating the force with volume, or monitoring the acoustics or imaging and providing an appropriate association. For an example of the former, attention is directed to FIG. 2B, which shows a similar cut-away, fragmentary view of the header 20, similar to FIG. 2A, yet with a plate 42 (e.g., impact plate) that extends across (e.g., side-to-side) the width of the header 20. In one embodiment, the plate 42 is disposed rearward of the conditioning rolls 34 and 36 and approximately of similar width, in the path of the volume of crop discharged from between the conditioning rolls 34 and 36. The plate 42 rotates about a pivot point 44, and is positioned to receive all or substantially the full impact of the crop that is discharged from between the conditioning rolls 34 and 36. The impact of the crop contacting the plate 42 causes the plate to pivot upward (e.g., to deflect), causing the plate 42 to contact a sensor 40B. The sensor 40B translates (e.g., transduces) the force into a signal that a controller receives to compute the volume (e.g., using a look-up table or algorithmically, such as via conversion factors). In one embodiment, the sensor 40B is embodied as a load cell that translates the deflection of the plate 42 into a signal that is received by the controller to compute the volume. In some embodiments, the plate 42 may be non-pivoting (e.g., fixed), and a sensor 40B embodied as an acoustic sensor may translate the sound of the impacting crop to a signal that is used by the controller to determine a volume. Note that in some embodiments, both sensor configurations shown in FIGS. 2A-2B may be used in a single machine.

Figure 3A:
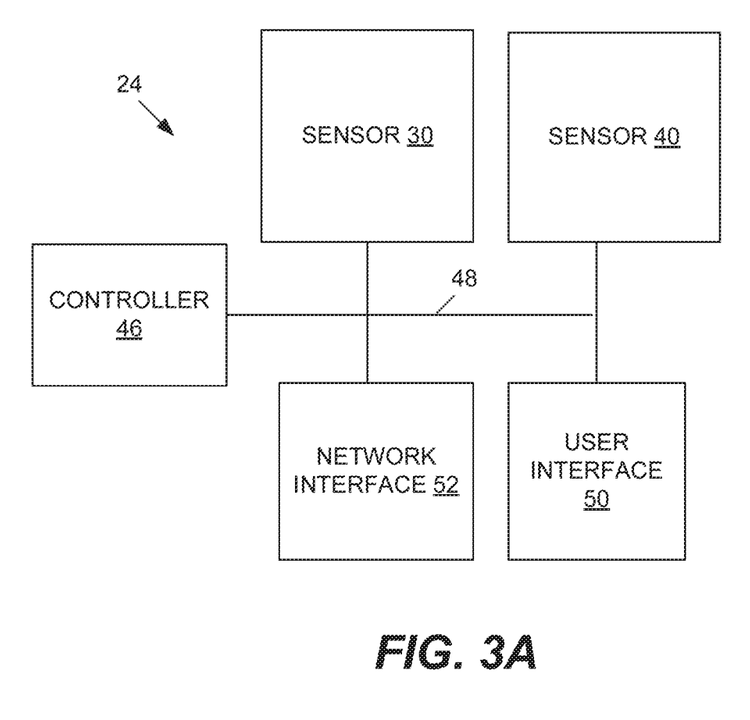
FIG. 3A is a block diagram of an embodiment of an example feed quality estimator system.

Having described some example operations of a feed quality estimator system 24, attention is directed to FIG. 3A, which illustrates an embodiment of a feed quality estimator system 24. It should be appreciated within the context of the present disclosure that some embodiments may include additional components or fewer or different components, and that the example depicted in FIG. 3A is merely illustrative of one embodiment among others. Further, in some embodiments, the feed quality estimator system 24 may be distributed among plural machines. For instance, sensing functionality may reside locally within the windrower 10 (FIG. 1) whereas the determination of feed quality may be achieved remotely (e.g., at the computing system 26, FIG. 1). The computing system 26 may include all or a portion of the features of the controller 46. Stated otherwise, at least a portion of the feed quality estimator system 24 may reside remotely from the windrower 10, or in some embodiments, there may be duplication or redundancy, such that all or a portion of the components shown in FIG. 3A may reside both at the windrower 10 and at a remote device or system. The feed quality estimator system 24 comprises one or more controllers, such as the controller 46. The controller 46 is coupled via one or more networks, such as network 48 (e.g., a CAN network or other network, such as a network in conformance to the ISO 11783 standard, also referred to as "Isobus"), to the sensors 30 and 40 (e.g., sensor 40 comprising sensors 40A and/or 40B, with the understanding that a single sensor or additional sensors may be used in some embodiments), a user interface 50, and a network interface 52. Note that system operations are primarily disclosed herein in the context of control via a single controller 46, with the understanding that additional controllers may be involved in one or more of the disclosed functionality in some embodiments.

As noted above, the sensors 30 and 40 may be embodied as contact (e.g., electromechanical sensors, such as position sensors, height or distance sensors, strain gauges, load cells, etc.) and non-contact type sensors (e.g., photo-electric, inductive, capacitive, acoustic, imaging, etc.), all of which comprise known technology. The user interface 50 may include one or more of a keyboard, mouse, microphone, touch-type display device, joystick, steering wheel, FNR lever, or other devices (e.g., switches, immersive head set, etc.) that enable input and/or output by an operator (e.g., to respond to, or monitor, indications presented on a display screen or aurally presented). For instance, in one embodiment, the feed quality value may be presented visually on a display device of the user interface 50 (or presented aurally, such as via a speaker or headset of the user interface 50)

during windrower operations (or at other times, such as retrieved from a storage device and rendered on a display or reproduced on a report for planning purposes). The network interface 52 comprises hardware and/or software that enable a wireless connection to one or more remotely located computing devices (e.g., computing system 26, FIG. 1) over a network (e.g., a wireless or mixed wireless and wired network, such as network 28, FIG. 1). For instance, the network interface 52 may cooperate with browser software or other software of the controller 46 to communicate with a server or other computing device over cellular links, among other telephony communication mechanisms and radio frequency communications, enabling remote monitoring, processing, and/or control of the windrower 10. The network interface 52 may comprise MAC and PHY components (e.g., radio circuitry, including transceivers, antennas, etc.), as should be appreciated by one having ordinary skill in the art.

In one embodiment, the controller 46 is configured to receive and process information from the sensors 30 and 40, and determine a feed quality value based on the input from the sensors 30 and 40. The controller 46 may communicate the currently determined (and optionally, the historically recorded, in some embodiments) feed quality value (in the form of a graphic or numeric value) to an operator in the cab 16 (FIG. 1) via the user interface 50, communicate the sensed parameters and/or the feed quality value to a remote location (e.g., the computing system 26 over the network interface 52 and the network 28, FIG. 1) for review by another user or users (which may be a remote operator and/or other personnel) and/or for processing, and/or store the determined feed quality value (and/or sensed parameters) in a storage device, including one having a fixed residence in the windrower 10 or removable (e.g., memory stick, optical and/or magnetic disc, etc.) for later review, planning, and/or processing.

Figure 3B:
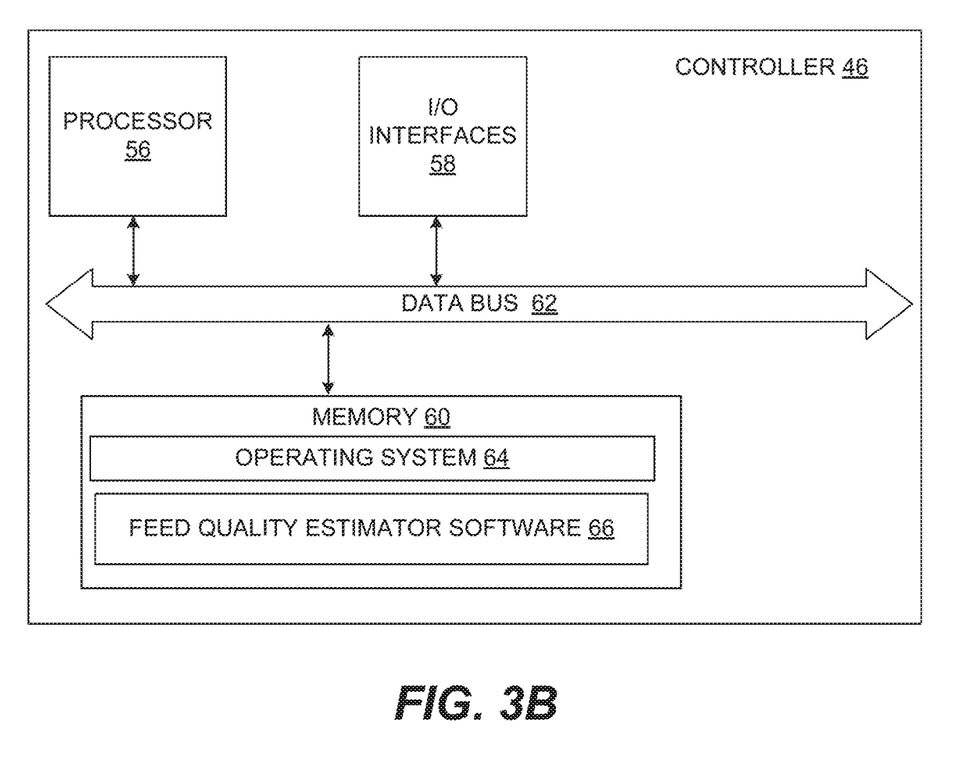
FIG. 3B is a block diagram of an embodiment of an example controller used in an embodiment of a feed quality estimator system.
Figure 4:
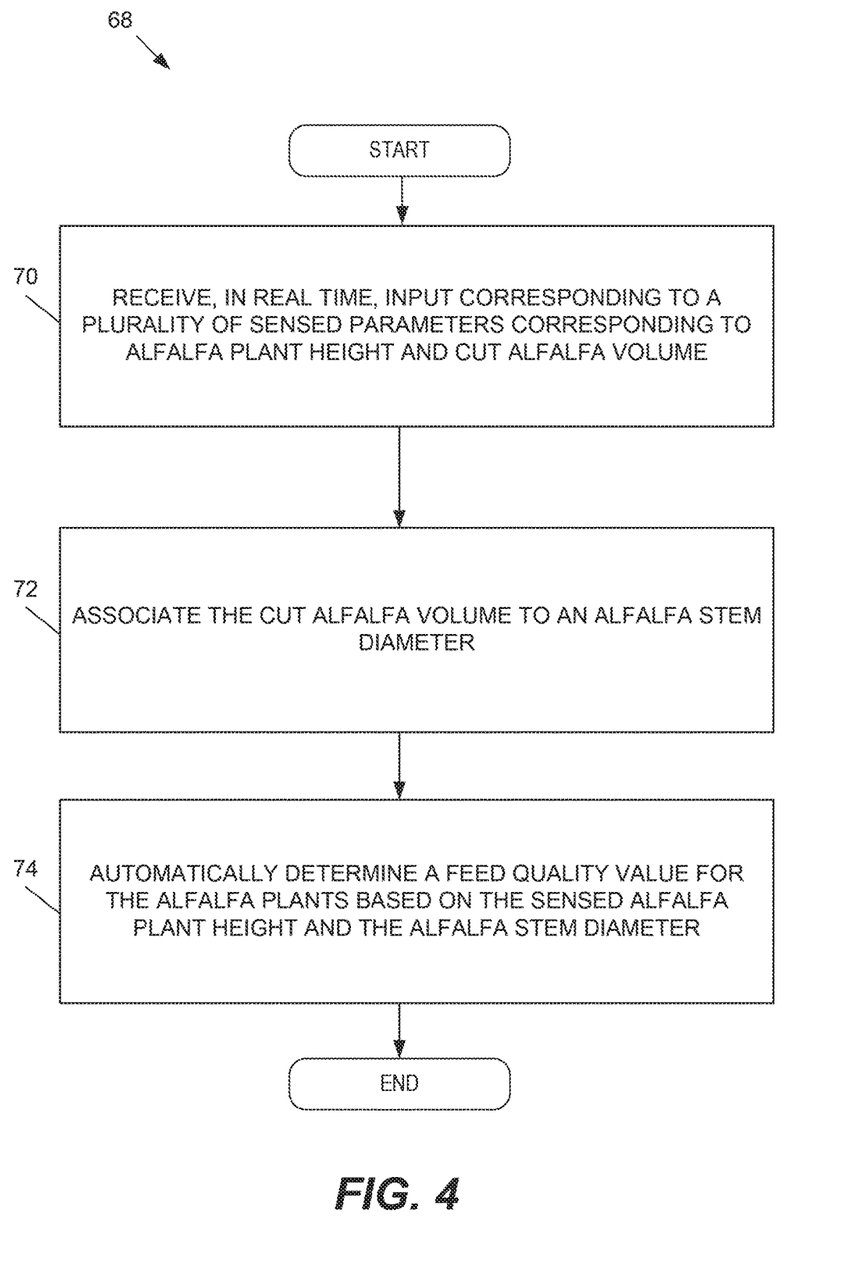
FIG. 4 is a flow diagram that illustrates an embodiment of a feed quality estimation method.

FIG. 3B further illustrates an example embodiment of the controller 46. One having ordinary skill in the art should appreciate in the context of the present disclosure that the example controller 46 is merely illustrative, and that some embodiments of controllers may comprise fewer or additional components, and/or some of the functionality associated with the various components depicted in FIG. 3B may be combined, or further distributed among additional modules, in some embodiments. It should be appreciated that, though described in the context of residing in the windrower 10 (FIG. 1), in some embodiments, the controller 46, or all or a portion of its corresponding functionality, may be implemented in a computing device or system (e.g., computing system 26, FIG. 1) located external to the windrower 10. Referring to FIG. 3B, with continued reference to FIG. 3A, the controller 46 is depicted in this example as a computer system, but may be embodied as a programmable logic controller (PLC), field programmable gate array (FPGA), application specific integrated circuit (ASIC), among other devices. As is known, the functionality of certain embodiments of the feed quality estimator system 24, when carried out in an ASIC or FPGA, is designed into the ASIC or FPGA according to a hardware description language (e.g., Verilog, VHDL, etc.). For embodiments using an FPGA, separate logic blocks (e.g., combinational logic or sub-portions thereof (e.g., simple logic gates, such as AND, OR gates)) may be used for separate or combined algorithmic steps of a feed quality estimator method. Programming of a PLC to perform one or more functionality of the feed quality estimator system 24 may be achieved using any of a variety of known mechanisms, such as via application software on a personal computer and communication with the PLC over a suitable connection (e.g., Ethernet, cabling according to RS-232, RS-485, etc.) to enter or edit ladder-type logic as is known, or via a programming board interface for storage of the program into memory (e.g., EEPROM, etc.). It should be appreciated that certain well-known components of computer systems are omitted here to avoid obfuscating relevant features of the controller 46. In one embodiment, the controller 46 comprises one or more processors (also referred to herein as processor units or processing units), such as processor 56, input/output (I/O) interface(s) 58, and memory 60 (also referred to as storage device), all coupled to one or more data busses, such as data bus 62. The memory 60 may include any one or a combination of volatile memory elements (e.g., random-access memory RAM, such as DRAM, and SRAM, etc.) and nonvolatile memory elements (e.g., ROM, hard drive, tape, CDROM, etc.). The memory 60 may store a native operating system, one or more native applications, emulation systems, or emulated applications for any of a variety of operating systems and/or emulated hardware platforms, emulated operating systems, etc.

In the embodiment depicted in FIG. 3B, the memory 60 comprises an operating system 64 and feed quality estimator software 66. It should be appreciated that in some embodiments, additional or fewer software modules (e.g., combined functionality) may be deployed in the memory 60 or additional memory. In some embodiments, a separate storage device may be coupled to the data bus 62, such as a persistent memory (e.g., optical, magnetic, and/or semiconductor memory and associated drives). The storage device may be a removable device, such as a memory stick or disc.

In one embodiment, the feed quality estimator software 66 is executed by the processor 56 to execute one or more algorithms that involve receiving sensor input(s), accessing one or more data structures in memory or other storage devices, converting the sensor input into values associated with maturity of the harvested plant, and determining (again, may be via access to one or more data structures or algorithmically performed using or more formulas) a feed quality value for the harvested plants. As an example, the feed quality estimator software 66 receives input corresponding to one or more parameters, such as standing height of the crop to be harvested, crop stem diameter, cut crop (e.g., cut stem) volume. For instance, the parameters may be associated with input received via the sensors 30 and 40 (FIG. 3A) that are coupled to the controller 46. When the controller 46, or one or more of its functionality, is implemented remotely, sensed parameters may be communicated via the network interface 52 at the windrower 10 (FIG. 1) and received at a similar network interface and/or I/O interface at the computing system 26 (FIG. 1) equipped with all or a portion of feed quality estimator software functionality for determination of feed quality, in real time or for processing at a later time. Using the windrower 10 as the location for all processing as an example illustration, the feed quality estimator software 66 compares the sensed parameters with a look-up table or other data structure stored internally (e.g., in memory 60 or other storage devices) or accessed remotely. For instance, the feed quality estimator software 66 compares the sensed plant height values (or a processed version of this value, such as an average or median height value, etc., though some embodiments may receive the processed version from the sensor 30) and stem diameter values with a table of predetermined values that associates the combined parameters with feed quality values. In some embodiments, the sensed volume value may be associated by the feed quality estimator software 66 with a corresponding stem diameter, and then compared to the predetermined values of the look-up table. In some embodiments, the association of the volume to stem diameters may already be embodied in the look up table, such that comparison of values is achieved through direct comparison of sensed volume with predetermined values for volume, wherein the table converts or associates the volume to the diameter. In some embodiments, if an operator (or other personnel) measure growth density (e.g., stand density) before cutting, the growth density value can be entered by the operator (e.g., via the user interface 50). The processor 56, through execution of the feed quality estimator software 66, may adjust the calculation of the measured crop volume read by the sensor 40 based on the entered growth density input. These and/or other mechanisms may be used to achieve the determination of the feed quality value, as should be appreciated by one having ordinary skill in the art in the context of the present disclosure. For instance, as indicated above, the feed quality estimator software 66 may convert the sensed volume based on an algorithm or programmed conversion factors, or plug the parameters into an algorithm that determines the feed quality value. In some embodiments, the feed quality estimator software 66 may account for growth density in determining the feed quality value. For instance, as indicated above, the operator of the windrower or other personnel may measure stand density at or proximal to the time of operations (e.g., placing an open structural frame over a representative patch of growth to visually determine (e.g., count) the quantity of plants within the frame (e.g., a 12 inch×12 inch frame), and enter these values (or a manually calculated growth density) at the user interface 50 (FIG. 3A). In some embodiments, the standing height may likewise be measured (e.g., using a standing stick) and likewise entered into the feed quality estimator software 66 via the user interface 50. In some embodiments, during commencement of operations, an imaging sensor (e.g., where the sensor 30 is embodied as an imaging sensor, or other sensors) may capture an image of the growth density and automatically enter this value as part of the feed quality estimator software functionality for consideration in determining the feed quality value. The growth density may be used to determine the population density of the alfalfa plants and/or the stem diameter of the standing plant. In some embodiments, the growth density is accessed remotely from a server that maintains a historical record of growth density, where the latest value entered (e.g., by a farmer or other personnel or automatically via a remote network-capable sensing device) or an average of values, etc., may be downloaded to the software 66 upon commencement of operations on the field (or at other times). As noted above, some of the feed quality value processing may be offloaded in part or in whole to another device or system, such as the computing system 26, during operations and/or at a later time, and in some embodiments, functionality of all or a part of the feed quality estimator software 66 may be performed concurrently at the windrower 10 and remotely (e.g., where the sensed input and/or determined feed quality values are processed locally and remotely).

Execution of the feed quality estimator software 66 may be implemented by the processor 56 under the management and/or control of the operating system 64. For instance, as is known, the source statements that embody the method steps or algorithms of the feed quality estimator software 66 may be translated by one or more compilers of the operating system 64 to assembly language and then further translated to a corresponding machine code that the processor 56 executes to achieve the functionality of the feed quality estimator software 66. Variations of this execution process are known, depending on the programming language of the software. For instance, if Java-based, the compiled output may comprise bytecode that may be run on any computer system platform for which a Java virtual machine or bytecode interpreter is provided to convert the bytecode into instructions that can be executed by the processor 56. Also, register transfer language (or other hardware description language) may be used to translate source code to assembly language, which the one or more operating system compilers translate to executable machine code. In some embodiments, the operating system 64 may be omitted and a more rudimentary manner of control implemented. The processor 56 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 46.

The I/O interfaces 58 provide one or more interfaces to the network 48 and other networks. In other words, the I/O interfaces 58 may comprise any number of interfaces for the input and output of signals (e.g., analog or digital data) for conveyance of information (e.g., data) over the network 48. The input may comprise input by an operator (local or remote) through the user interface 50 and input from signals carrying parameters from the sensors 30 and 40 and/or from the network interface 52, among other devices.

When certain embodiments of the controller 46 are implemented at least in part with software (including firmware), as depicted in FIG. 3B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the controller 46 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In view of the above description, it should be appreciated that one embodiment of a feed quality estimation method 68, which in one embodiment comprises an algorithm performed by the processor 56 executing the feed quality estimator software 66 (though not limited to the platform or execution mechanisms disclosed herein) comprises: receiving, in real time, input corresponding to a plurality of sensed parameters corresponding to alfalfa plant height and cut alfalfa volume (70); associating the cut alfalfa volume to an alfalfa stem diameter (72); and automatically determining a feed quality value for the alfalfa plants based on the sensed alfalfa plant height and the alfalfa stem diameter (74). As described above, the associating and determining may be achieved through the use of one or more look-up-tables of pre-defined values (or via execution of suitable algorithms) stored in memory or generally a storage device that is accessed by, for instance, the processor 56 of the controller 46 (FIG. 3B). In some embodiments, the determined feed quality value may be presented to an operator of the windrower 10 (FIG. 1) or to a user (e.g., operator) in a remote location in real-time, or in some embodiments, at other times. In some embodiments, additional input may be received, such as measured growth density manually input by an operator into the agricultural machine (e.g., user interface 50, FIG. 3A) or electronically communicated to the processor 56 from a device measuring that value in the field.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

Note that in some embodiments, as the alfalfa is being cut, the field position of the cutting implement may be recorded and referenced to a geographical coordinate position (e.g., GPS location). The feed values that are calculated may be associated with this position record and later referenced when the crop is harvested with a baler or forage harvester.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the disclosed systems and methods have been described with reference to the example embodiments illustrated in the attached drawing figures, it is noted that equivalents may be employed and substitutions made herein without departing from the scope of the disclosure as protected by the following claims.

At least the following is claimed:

1. A windrower, comprising:
    a header comprising a crop cutting assembly;
    a chassis coupled to the header; and
    a system, comprising:
        plural sensors comprising first and second sensors, wherein the first sensor monitors alfalfa plant height and the second sensor monitors cut alfalfa volume;
        a controller configured to:
            receive input from the plural sensors;
            determine a feed quality value based on the received input; and
            present the feed quality value to an operator of the windrower.

2. The windrower of claim 1, further comprising a set of conditioning rolls, wherein the second sensor monitors a gap between the set of conditioning rolls through which the cut alfalfa volume flows.

3. The windrower of claim 2, wherein the controller is further configured to associate the cut alfalfa volume with an alfalfa stem diameter.

4. The windrower of claim 1, further comprising a storage device, wherein the controller is configured to determine the feed quality value based on comparison of the input with a predetermined alfalfa plant height and a predetermined cut alfalfa volume or stem diameter stored in the storage device.

5. The windrower of claim 1, further comprising a display device, wherein the controller is configured to present the feed quality value by rendering the feed quality value on the display device during operation of the windrower.

6. The windrower of claim 1, further comprising a network interface, wherein the controller is further configured to cause transmission of the feed quality value to a remote device.

7. The windrower of claim 1, further comprising a network interface, wherein the controller is further configured to cause transmission of the input to a remote device.

8. The windrower of claim 1, further comprising an impact plate upon which the cut alfalfa volume impacts, wherein the sensor that monitors the cut alfalfa volume is coupled to the impact plate.

9. A windrower, comprising:
    a header comprising a crop cutting assembly;
    a chassis coupled to the header; and
    a system, comprising:
        plural sensors comprising first and second sensors, wherein the first sensor monitors alfalfa plant height and the second sensor monitors cut alfalfa volume;
        a controller configured to:
            receive input from the plural sensors;
            determine a feed quality value based on the received input; and
            present the feed quality value to an operator of the windrower;
            receive additional input corresponding to a measured growth density value and determine the feed quality value based also on the additional input.

10. A method implemented in an agricultural machine harvesting alfalfa plants, the method comprising:
    receiving, in real time, input corresponding to a plurality of sensed parameters corresponding to alfalfa plant height and cut alfalfa volume;
    associating the cut alfalfa volume to an alfalfa stem diameter; and
    automatically determining a feed quality value for the alfalfa plants based on the sensed alfalfa plant height and the alfalfa stem diameter.

* * * * *